US008438995B1

(12) United States Patent
Donahue et al.

(10) Patent No.: US 8,438,995 B1
(45) Date of Patent: May 14, 2013

(54) COLLAPSIBLE ANIMAL RUN

(75) Inventors: Karl J Donahue, Overland Park, KS (US); Larry A Matthes, Sibley, MO (US)

(73) Assignee: T Kennel Systems, Inc., Kansas City, KS (US)

( * ) Notice: Subject to any disclaimer, the term of this patent is extended or adjusted under 35 U.S.C. 154(b) by 208 days.

(21) Appl. No.: 12/910,307

(22) Filed: Oct. 22, 2010

(51) Int. Cl.
*A01K 1/00* (2006.01)

(52) U.S. Cl.
USPC ........... 119/514; 119/502; 119/504; 119/513; 119/512; 119/523; 119/452; 256/26; 256/25

(58) Field of Classification Search .......... 119/512–514, 119/516, 412–417, 452, 453, 455, 481, 482, 119/491, 492, 494, 501, 502, 504, 519, 523, 119/524, 522, 712; 256/25, 26, 67, DIG. 2
See application file for complete search history.

(56) References Cited

U.S. PATENT DOCUMENTS

| | | | | | |
|---|---|---|---|---|---|
| 327,305 | A | * | 9/1885 | Parker | 119/413 |
| 329,716 | A | * | 11/1885 | Chamberlin | 119/412 |
| 340,946 | A | * | 4/1886 | Grossman | 119/412 |
| 989,029 | A | | 4/1911 | Newcomb | |
| 1,973,952 | A | | 9/1934 | Golberg | |
| 2,121,658 | A | | 8/1936 | Gehret | |
| 3,204,606 | A | * | 9/1965 | Parr et al. | 119/514 |
| 3,804,065 | A | * | 4/1974 | Coates | 119/412 |
| 4,072,295 | A | | 2/1978 | Roberts | |
| 4,140,080 | A | | 2/1979 | Snader | |
| 4,537,151 | A | * | 8/1985 | Bolton | 119/512 |
| 4,763,606 | A | | 8/1988 | Ondrasik, II | |
| 4,819,582 | A | | 4/1989 | Lichvar | |
| 4,836,143 | A | * | 6/1989 | Shadbolt, Jr. | 119/514 |
| 5,353,738 | A | | 10/1994 | Chiu | |
| 5,549,073 | A | | 8/1996 | Askins et al. | |
| 5,626,098 | A | | 5/1997 | Askins et al. | |
| 5,826,545 | A | | 10/1998 | Steffes et al. | |
| 6,467,433 | B1 | * | 10/2002 | Stanton et al. | 119/512 |
| 6,550,424 | B1 | * | 4/2003 | Gao | 119/474 |
| 6,722,315 | B2 | | 4/2004 | Sinor | |
| 7,178,482 | B1 | * | 2/2007 | Derrick | 119/484 |
| 7,343,876 | B2 | | 3/2008 | Frisbee | |
| 7,958,616 | B2 | * | 6/2011 | Meyer, Jr. | 29/468 |
| 2002/0139315 | A1 | * | 10/2002 | Calvert et al. | 119/512 |

(Continued)

OTHER PUBLICATIONS

Advertisement for Kennel Doors, Kennel Gates and Room Dividers by Stone Mountain Pet Products appearing in *Pet Services Journal*, Jan./Feb. 2011, 1 pg.

*Primary Examiner* — Andrea Valenti
(74) *Attorney, Agent, or Firm* — Stinson Morrison Hecker LLP

(57) ABSTRACT

An animal run having first and second side panels operable to be pivotally mounted along a central plane. A front panel is pivotally coupled with one of the side panels and operable to be detachably coupled to the other side panel. The side panels are moveable between a stored position, in which each side panel is positioned parallel the central plane, and an operational position, in which they extend outward at an angle from the central plane. The front panel is moveable between a stored position, in which it is positioned parallel the central plane, and an operational position, in which it is positioned at an angle from the side panel to which it is coupled and is detachably coupled with the other side panel. The side panels and front panel define an interior space for housing an animal when in their operational position.

32 Claims, 13 Drawing Sheets

U.S. PATENT DOCUMENTS

2003/0209207 A1* 11/2003 Campbell et al. ............. 119/513
2003/0209208 A1* 11/2003 Campbell et al. ............. 119/513

2008/0110412 A1  5/2008  Shimoda et al.

* cited by examiner

COLLAPSIBLE ANIMAL RUN

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates generally to an animal housing device commonly referred to as a run, and more particularly, to a foldable or collapsible run.

2. Description of Related Art

A variety of different devices, such as kennels, pens and runs, are used by animal care professionals to safely house and contain companion animals such as dogs and cats. The devices come in many different shapes and sizes and are constructed out of various materials. Typically, they include a plurality of walls that enclose an interior space and a door to provide access to that space. Some of the devices also have floors and/or top walls.

The type of housing device that is best suited for a particular application is determined by the number, nature, and size of the animals to be housed within the device, and the kind of care provided to the animal. For example, a larger containment area is desired for housing larger animals or when an animal needs to be housed for an extended period of time. When a larger containment area is desired, runs often are favored over traditional cages because runs are typically wider and longer. While typical runs are approximately three to four feet wide and six to eight feet deep, cages for companion animals are typically no more than six feet wide and approximately two feet deep.

A typical run is rectangular in shape and has two side panels, a back panel, and a front gate panel. Runs also typically have a floor and sometimes a top panel. The panels are welded or bolted together to create a fixed unit. It is normal for several runs to be deployed side by side and front to back to create a bank. In these situations, the individual runs will share a common side or back panel. In addition, runs are often equipped with internal drain mechanisms or they are positioned to use the drainage system of the facility where they are installed.

The relative advantages of roominess and comfort offered by runs as compared to other housing alternatives dictate that they have certain characteristics. By their very nature, they tend to be large and occupy a lot of floor space. A single three by six foot run covers approximately eighteen square feet and a bank of five runs nearly 100 square feet. In addition, runs are typically static. Once the various run panels are assembled, there is little opportunity to modify the shape or size of the run. Finally, runs (especially in bank form) are generally stationary. After installation, the space dedicated to a run is permanently allocated to that usage.

In many applications, the size and structural characteristics of runs are anticipated. Boarding kennels, animal control facilities, and humane societies are often purpose built facilities designed for the use of runs. But for various other professionals, it can be challenging to incorporate runs into their practice due to insufficient available space or the high cost of permanently devoting floor space to occasionally used runs. These situations are common with professionals that provide services for larger animals (such as veterinarians that do not board and groomers) but do not keep animals at their facilities for extended periods.

Animal care professionals that do not have the facilities to house large animals clearly face a quandary. They can either decline to provide services or choose to house an animal in a less than optimal manner, such as housing an animal in a smaller cage than needed or using a physical restraint such as a leash or tether. Similar concerns are shared by professionals that have runs for housing large animals but are occasionally faced with excess demand for space such as during holidays and heavy travel periods. In these situations, the professionals must house animals in temporary kenneling that is not designed for long stays, which means that more staff involvement is necessary to exercise and otherwise handle the animals.

BRIEF SUMMARY OF THE INVENTION

The present invention is directed toward a collapsible animal run or cage that can be folded and stored when not in use. When deployed, the invention is similar in form and function to a traditional run in that it provides a fixed area to house animals. The collapsible run has panels that are attached to one another in a manner that allows an unoccupied run to be collapsed into a closed position. The collapsible run benefits animal care professionals that face space constraints, have only intermittent needs for larger housing units, or occasionally face excess demand for such housing units.

A collapsible animal run according to one embodiment of the present invention includes first and second side panels that each pivot relative to a fixed pivot point such that each side panel is pivotable between a stored position and an operational position. A front panel is pivotally coupled with one of the side panels and configured to be detachably coupled to the other side panel when in the operational position. The pivot points for the side panels are aligned along a central plane. When in the stored position, the front panel is positioned parallel the side panel to which it is pivotally coupled and is detached from the other side panel. In addition, the side and front panels are all positioned substantially parallel the central plane. When in the operational position, the side panels are pivoted outward and positioned at an angle from the central plane, preferably at a right angle. The front panel is also pivoted outward and positioned at an angle, preferably at a right angle, from the side panel to which it is pivotally coupled and is detachably coupled with the other side panel. The side panels and front panel together define an interior space for receiving an animal when the panels are in their operational position.

In a preferred embodiment, the first and second side panels are pivotally mounted to a support structure wherein the support structure extends within a central plane. The support structure preferably comprises a vertically extending wall that can also serve to enclose the interior space. The side panels are mounted a distance apart along the length of the wall and the panels are collapsible against and parallel the wall to free up floor space when in the stored position. Alternatively, the side panels are mounted to a floor at pivot points positioned along the central plane adjacent a vertically extending wall that serves to enclose the interior space. In another embodiment, the support structure comprises two or more vertically extending posts that are aligned in a central plane with the first and second side panels mounted to the first and second posts respectively. In yet another embodiment, the support structure can comprise a rear panel that serves to enclose the interior space when each of the side panels and the front panel is in its operational position. The side panels may be directly pivotally mounted to the support structure or indirectly pivotally mounted using mounts that are preferably fixedly attached to the support structure and may be integrally formed with the side panels.

The animal run may additionally include a floor that pivots relative to one or more fixed pivot points along the central plane. The floor is moveable between a stored position in which the upper surface of the floor is aligned substantially parallel the central plane, and an operational position in which a front edge of the floor is positioned adjacent a bottom edge of the front panel.

The animal run may comprise a single interior space for housing one or more animals together within that single space, or may comprise a plurality of interior spaces positioned adjacent one another in a row so as to separately house one or more animals in each space. For a run having a plurality of interior spaces, additional side panels, front panels and optionally rear panels and/or floors are included in series, with each of the side panels pivoting relative to a fixed pivot point aligned along the central plane.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means of the instrumentalities and combinations particularly pointed out in the appended claims.

DETAILED DESCRIPTION OF PREFERRED EMBODIMENT

Figure 1:
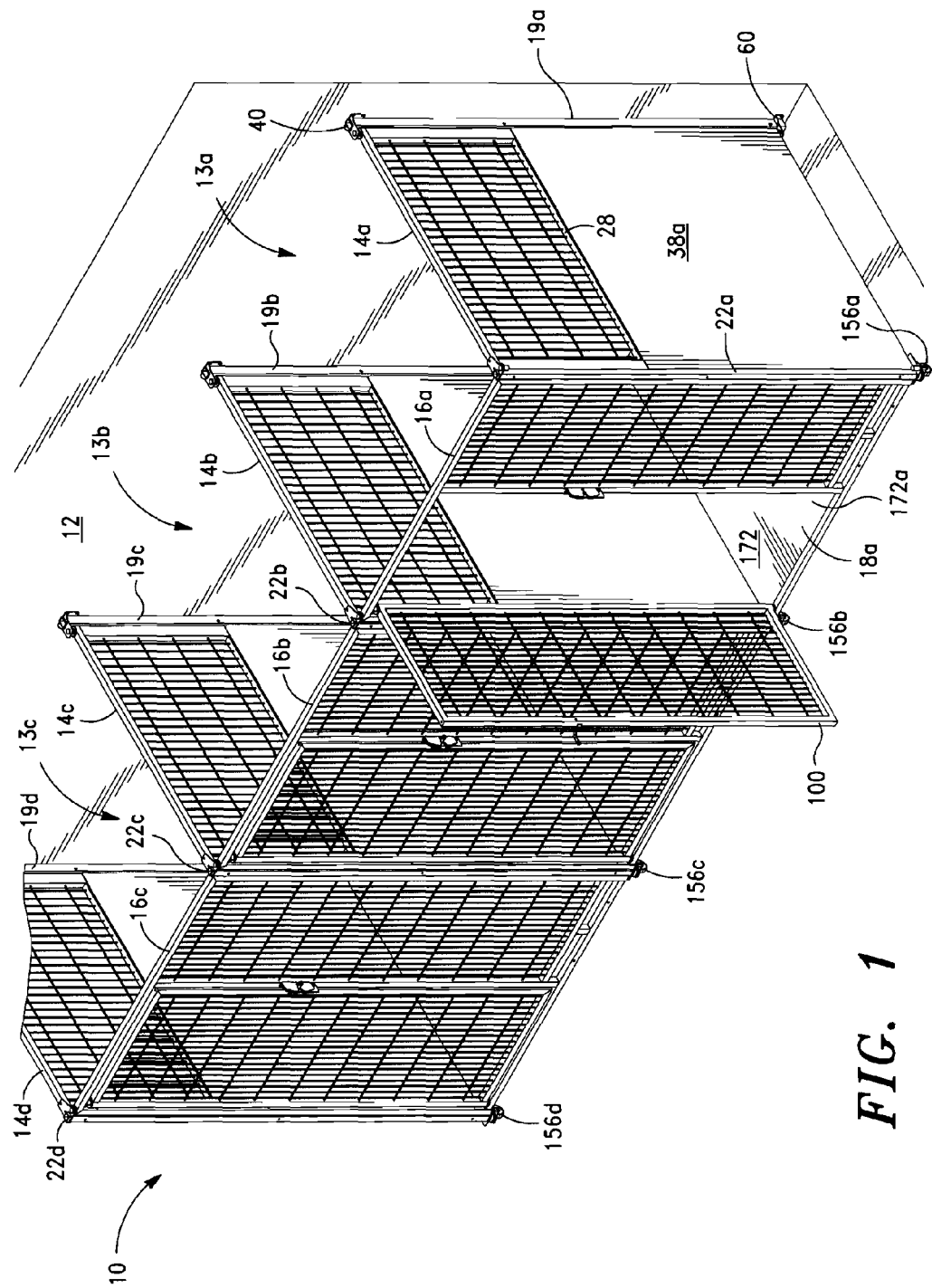
FIG. 1 is a perspective view of a bank of animal runs in accordance with the present invention.
Figure 2:
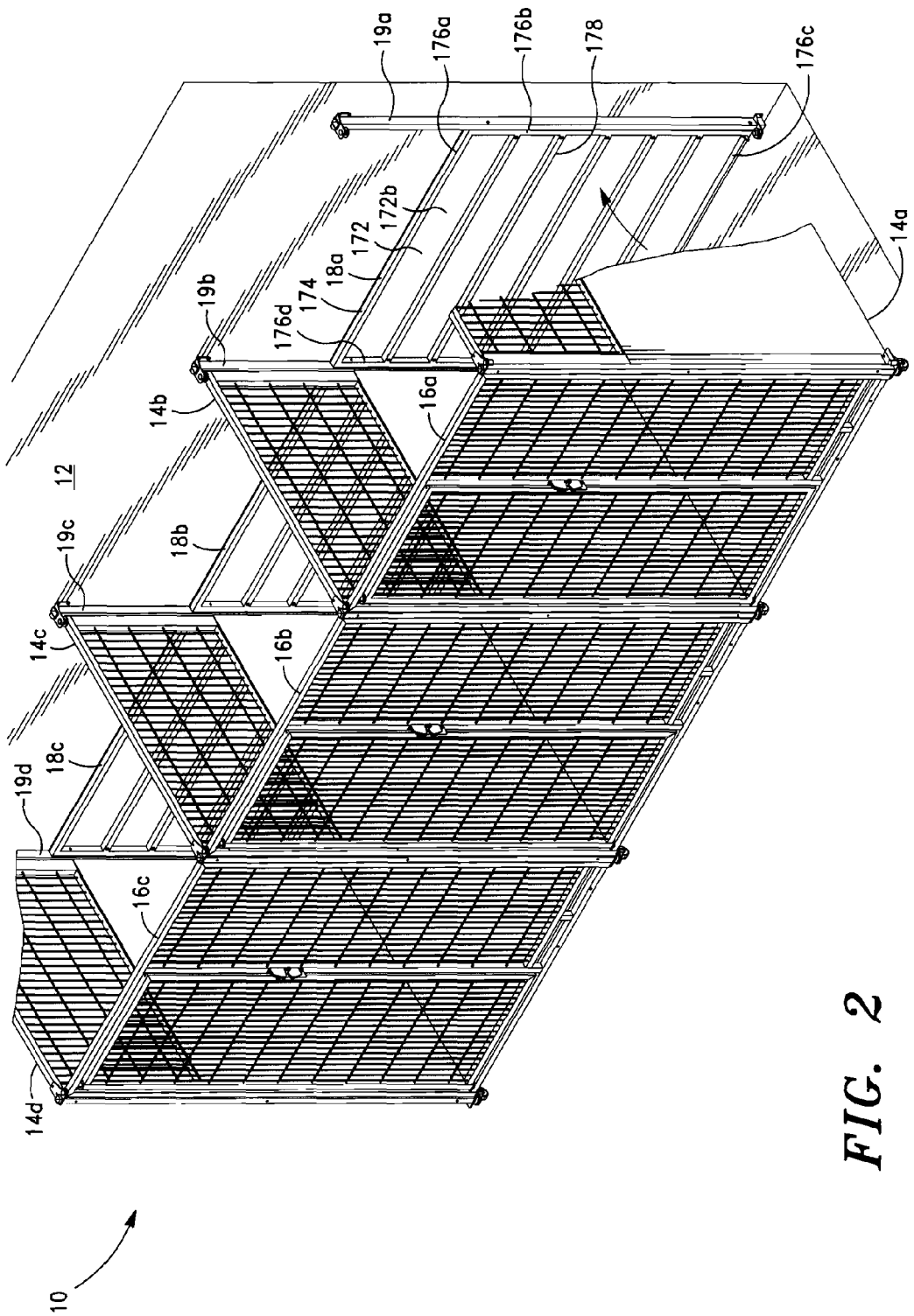
FIG. 2 is a perspective view of the run bank of FIG. 1 showing floor panels in a stored position.

Referring now to FIG. 1, a bank of animal cages or runs in accordance with an embodiment of the present invention is shown generally as 10. The rear of the run bank 10 is secured to a wall 12. The run bank 10 includes three cages or runs 13a, 13b, and 13c that are formed from four side panels 14a-d, three front panels 16a-c, and three floor panels 18a-c, which are shown in FIG. 2. Side panels 14a-d are pivotably mounted to wall 12 via mounting posts 19a-d, front panels 16a-c are pivotably mounted to side panels 14b-d, respectively, and each floor panel 18a-c is pivotably mounted to a pair of adjacent posts 19a-d. Run 13a is formed from side panels 14a and 14b, front panel 16a and floor panel 18a, run 13b is formed from side panels 14b and 14c, front panel 16b and floor panel 18b, and run 13c is formed from side panels 14c and 14d, front panel 16c and floor panel 18c. The panels that form each of the runs 13a-c, along with wall 12, define an enclosed space for housing animals. Although run bank 10 is shown with three runs 13a-c, it is within the scope of the invention for the run bank 10 to have any number of runs by adding additional side, front, and floor panels and mounting posts. Further, although run bank 10 is shown mounted to wall 12, it is possible for run bank 10 to be mounted to any support structure capable of supporting the run bank.

Figure 3:
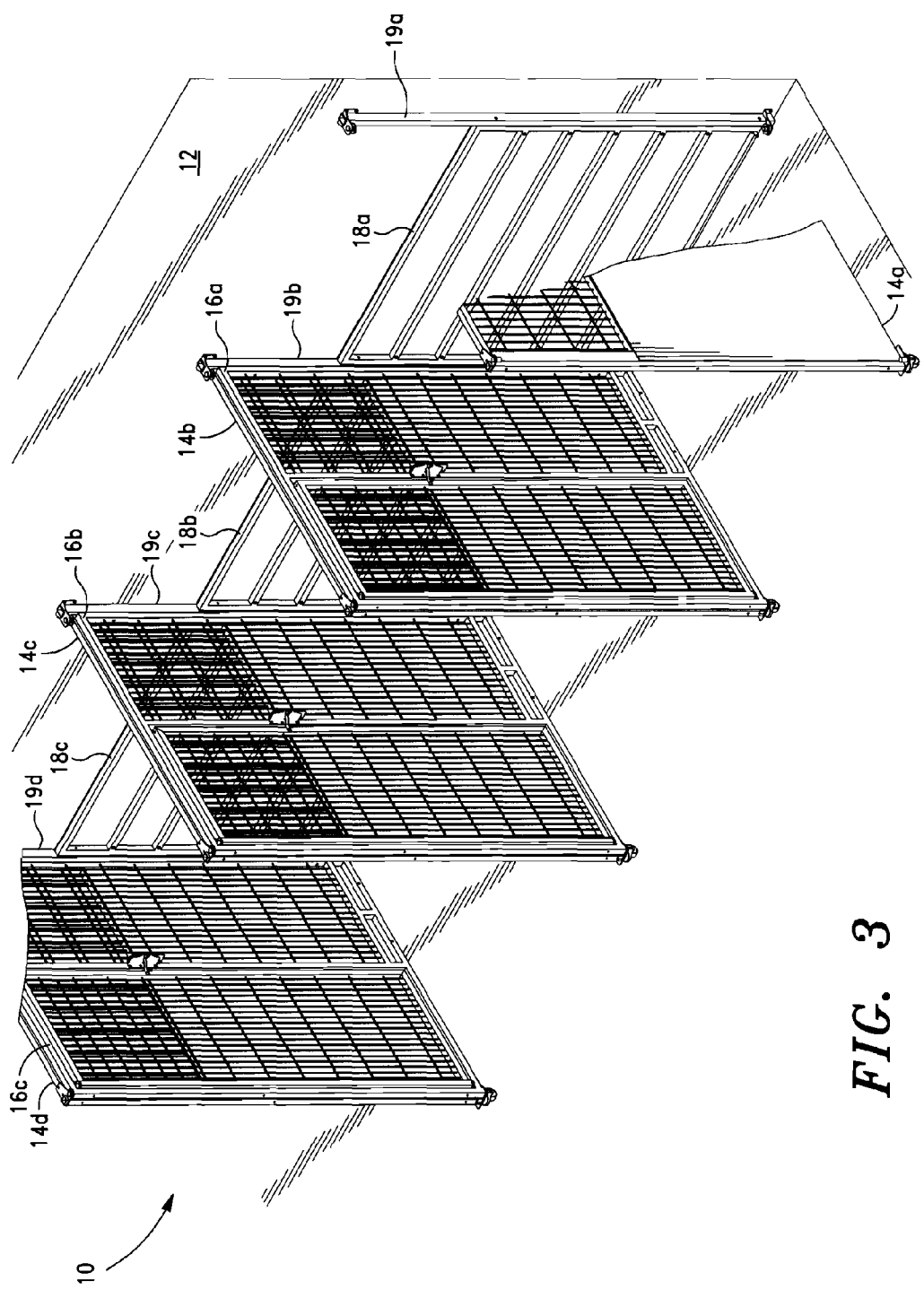
FIG. 3 is a perspective view of the run bank of FIG. 1 showing front panels folded against side panels.
Figure 4:
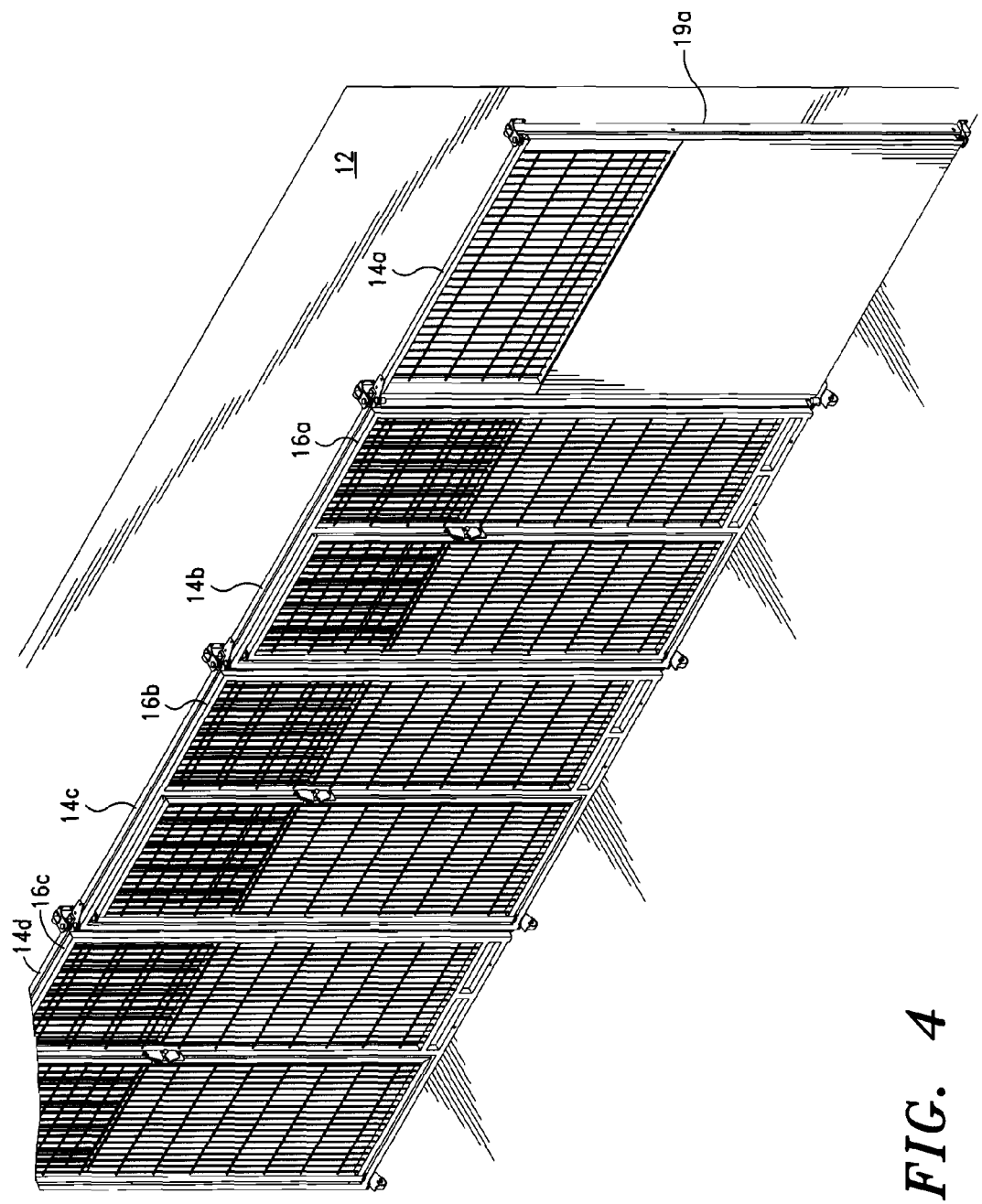
FIG. 4 is a perspective view of the run bank of FIG. 1 showing front and side panels folded against a support structure.
Figure 5:
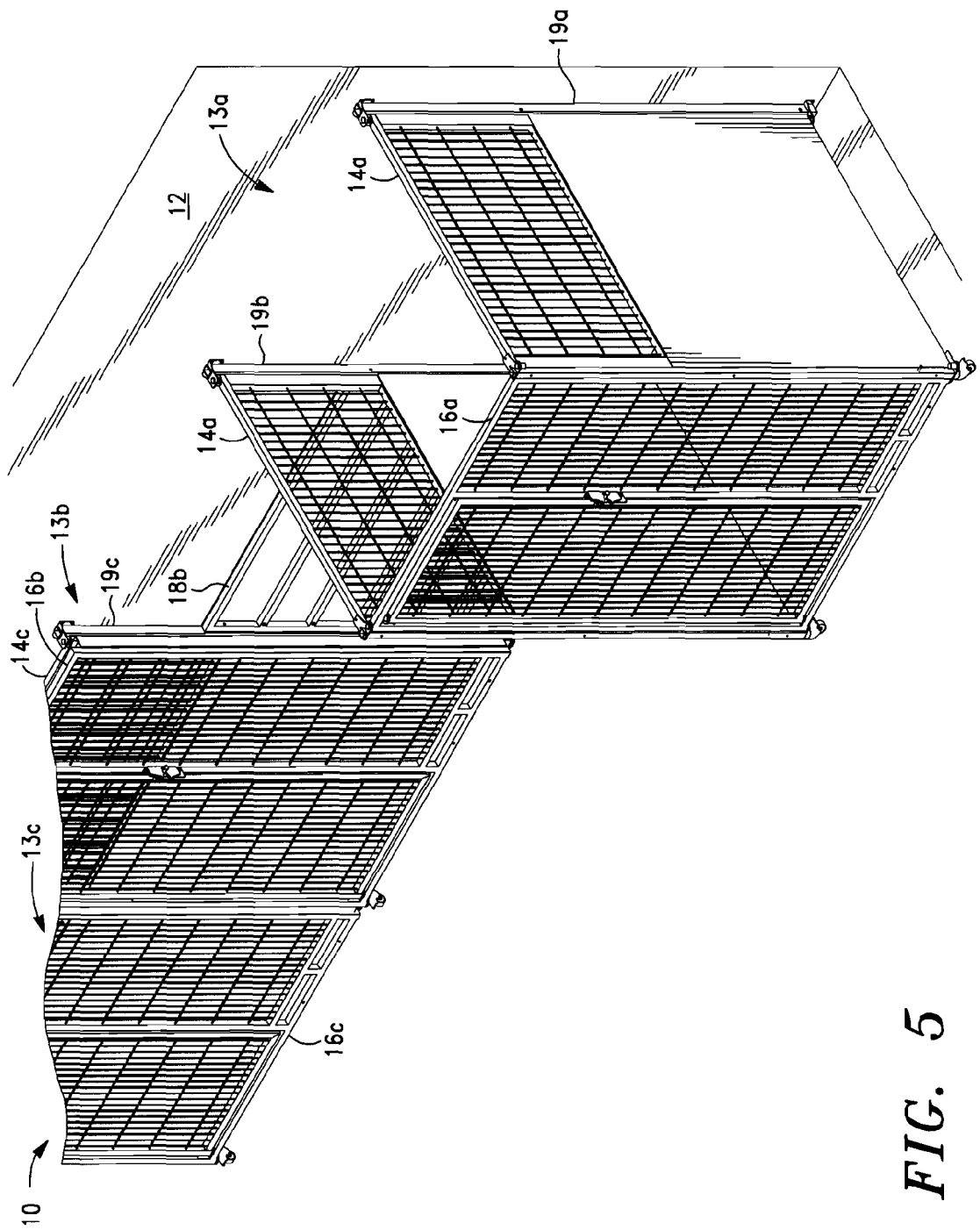
FIG. 5 is a perspective view of the run bank of FIG. 1 showing one of the runs in an operational position.

As shown in FIG. 4, the run bank 10 can be folded and stored against wall 12 when not in use. The steps for folding run bank 10 against wall 12 for storage are shown in FIGS. 1-4. FIG. 1 shows the run bank 10 in an operational position in which the side panels 14a-d extend outward from wall 12, each of front panels 16a-c extends between a pair of adjacent side panels 14a-d, and floor panels 18a-c extend outward from wall 12 to front panels 16a-c, respectively. The first step in collapsing run bank 10 is shown in FIG. 2. In FIG. 2 the floor panels 18a-c are folded up against wall 12 in a position where each panel is positioned between a pair of adjacent posts 19a-d. FIG. 3 shows the next step in which front panels 16a-c are folded adjacent to side panels 14b-d, respectively. FIG. 4 shows the last step in which side and front panels 14a-d and 16a-c are folded adjacent to wall 12 for storage in a position where each panel is positioned between a pair of adjacent posts 19a-d. Thus, as shown in FIG. 4, an operator of the run bank 10 can fold the runs against wall 12 in order to clear floor space when the run bank 10 is not in use. It is possible for any number of the runs 13a-c making up run bank 10 to be in an operational position while the remainder are in a stored position. FIG. 5 shows one such example where run 13a is operational while runs 13b and 13c are stored adjacent wall 12.

Figure 7:
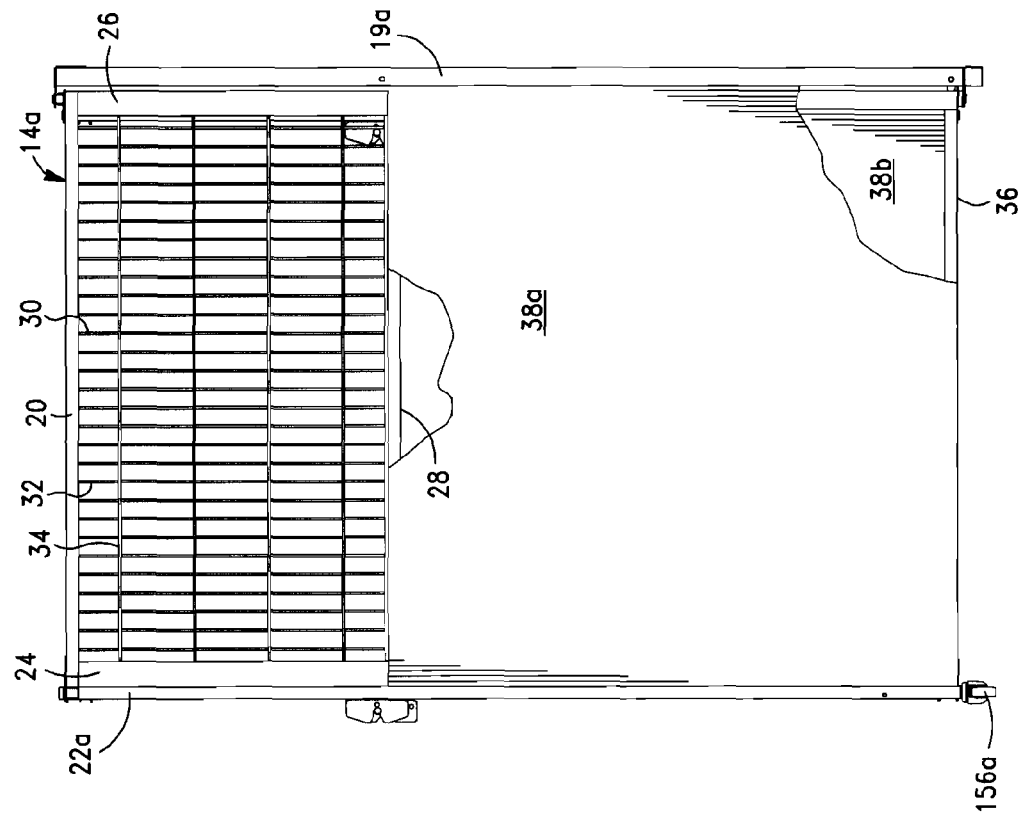
FIG. 7 is a side elevational view of one of the side panels.

Side panel 14a is described in detail herein with reference to FIG. 7. Because each of the side panels 14a-d has a similar construction, only side panel 14a is described in detail herein. Side panel 14a is pivotably joined to post 19a such that a rear edge of the side panel 14a is adjacent to post 19a and a front edge of the side panel is adjacent to front panel 16a. Side panel 14a has a horizontal top frame bar 20 that is joined with vertical outer and inner front frame bars 22a and 24 and a vertical rear frame bar 26. A horizontal intermediate frame bar 28 is joined with and extends between frame bars 24 and 26. A wire grid 30 consisting of a plurality of interconnected vertical rods 32 and horizontal rods 34 is positioned in the area between frame bars 20, 24, 26, and 28. Vertical rods 32 are joined with and extend between frame bars 20 and 28, and horizontal rods 34 are joined with and extend between frame bars 24 and 26. Side panel 14a also has a bottom frame bar 36 that is joined with and extends between frame bars 22a and 26. Panels 38a and 38b, which are parallel to wire grid 30, are joined to opposite sides of frame bars 24, 26, 28, and 36. Frame bars 20, 22a, 24, 26, 28, and 36 are preferably hollow, rectangular bars constructed from metal, such as stainless steel or aluminum, or plastic. Wire grid 30 is preferably constructed from metal or plastic, and panels 38a and 38b are preferably constructed from metal, plastic, or glass.

Figure 13A:
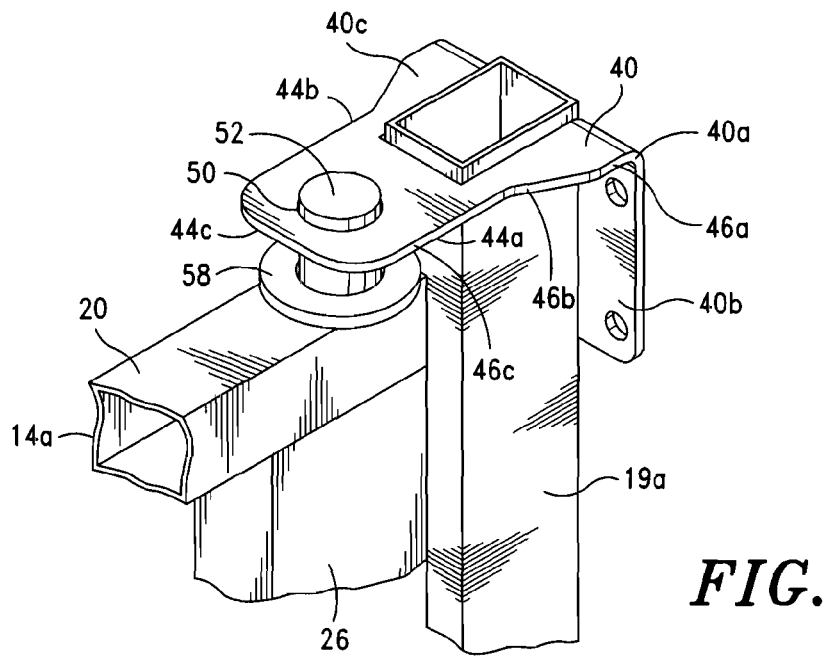
FIG. 13A is a detail view of a pivotal connection between the top of the mounting post and the side panel.
Figure 13B:
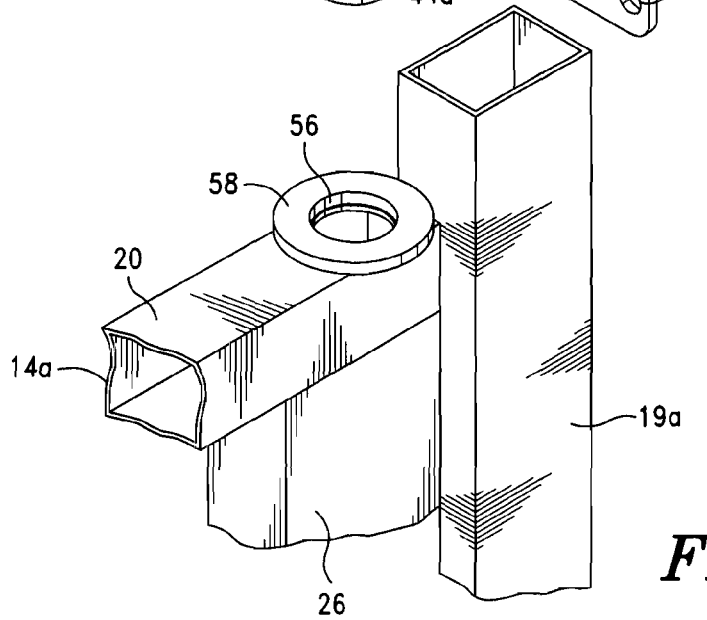
FIG. 13B is a partially exploded view of the pivotal connection between the top of the mounting post and the side panel.

FIGS. 13A and B show the pivotal connection between the rear edge of side panel 14a and an upper mounting bracket 40 joined to post 19a. Bracket 40 comprises a sheet of material with a right angle bend 40a that forms a vertical section 40b and a horizontal section 40c. Vertical section 40b is generally rectangular and includes four holes 42a-d for receiving fasteners (not shown) to secure the bracket 40 to wall 12. Horizontal section 40c is a sheet of material with opposing side edges 44a and 44b extending outward from bend 40a and a front edge 44c extending between the side edges 44a and b opposite bend 40a. Side edges 44a and b are a mirror image of each other; accordingly, only side edge 44a is described in detail herein. Side edge 44a includes a first, linear section 46a that extends outward from bend 40a perpendicular to vertical section 40b. Linear section 46a transitions into a second, tapered section 46b as the width of the horizontal section 40c decreases. Tapered section 46b transitions into a linear section 46c that is parallel with section 46a and is joined with front edge 44c. The horizontal section 40c has a rectangular opening 48 (FIG. 13B) that extends outward from bend 40a to a position that is near where tapered section 46b transitions into linear section 46c. The horizontal section 40c also has a circular opening 50 that is positioned adjacent front edge 44c. Opening 50 receives a cylindrical pin 52 that is joined to bracket 40 preferably by welding.

Rectangular opening 48 receives an upper portion of mounting post 19a and is joined to the mounting post 19a preferably by welding. An opening 56 in the top frame member 20 of side panel 14a receives the bottom of pin 52 to pivotably connect the top of side panel 14a to bracket 40 and mounting post 19a. There is also a washer 58 joined to top frame member 20 that is aligned with opening 56 for receiving pin 52.

Figure 14A:
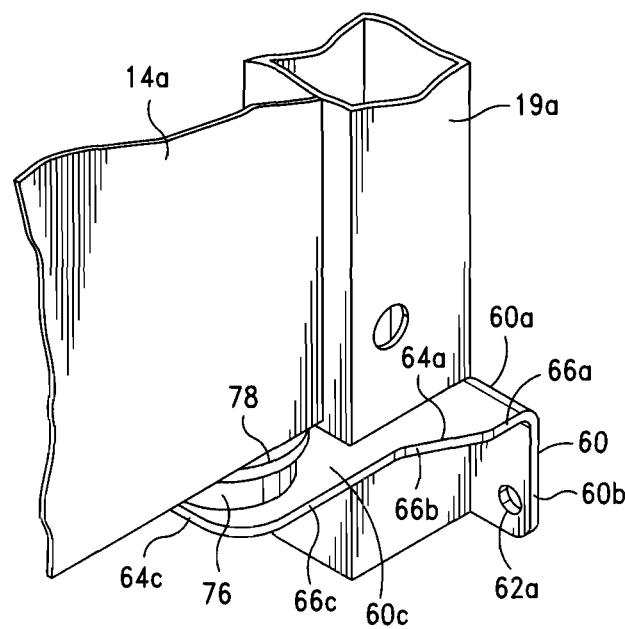
FIG. 14A is a detail view of a pivotal connection between the bottom of the mounting post and the side panel.
Figure 14B:
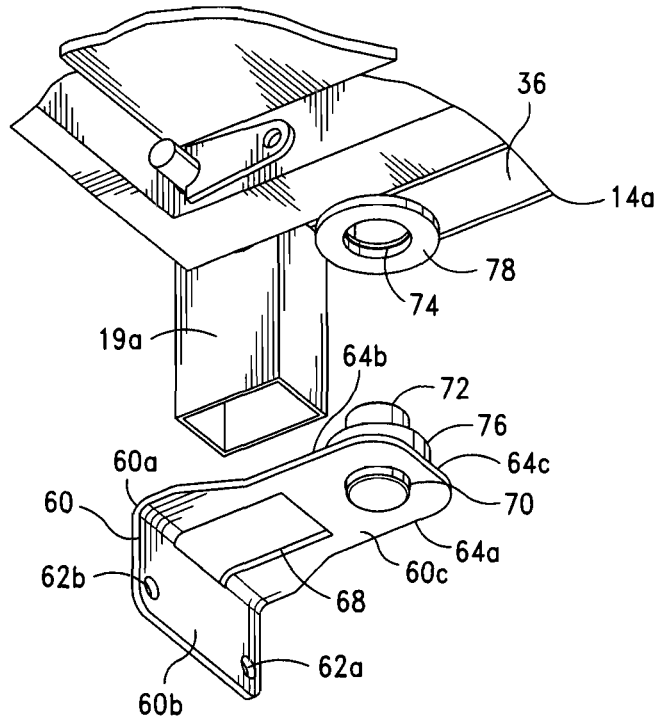
FIG. 14B is a partially exploded view of the pivotal connection between the bottom of the mounting post and the side panel.

FIGS. 14A and 14B show the pivotal connection between side panel 14a and a lower mounting bracket 60 joined to post 19a. Bracket 60 comprises a sheet of material with a right angle bend 60a that forms a vertical section 60b and a horizontal section 60c. Vertical section 60b is generally rectangular and includes two holes 62a and 62b for receiving fasteners (not shown) to secure the bracket 60 to wall 12. Horizontal section 60c is a sheet of material with opposing side edges 64a and 64b (FIG. 14B) extending outward from bend 60a and a front edge 64c extending between the side edges 64a,b opposite bend 60a. Side edges 64a,b are mirror images of each other; accordingly, only side edge 64a is described in detail herein. Side edge 64a includes a first, linear section 66a (FIG. 14A) that extends outward from bend 60a perpendicular to vertical section 60b. First section 66a transitions into a second, tapered section 66b as the width of the horizontal section 60c decreases. Tapered section 66b transitions into a linear section 66c that is parallel with section 66a and is joined with front edge 64c. The horizontal section 60c has a rectangular opening 68 (FIG. 14B) that extends outward from bend 60a to a position that is near where tapered section 66b transitions into linear section 66c. The horizontal section 60c also has a circular opening 70 that is positioned adjacent front edge 64c. Opening 70 receives a cylindrical pin 72 that is joined to bracket 60 preferably by welding.

Rectangular opening 68 receives a lower portion of mounting post 19a and is joined to the mounting post 19a preferably by welding. An opening 74 in the bottom frame member 36 of side panel 14a receives the top of pin 72 to pivotably connect the bottom of side panel 14a to bracket 60 and mounting post 19a. A spacer 76 is positioned around pin 72 between bottom frame member 36 and horizontal section 60c. A washer 78 is joined to bottom frame member 36. Washer 78 has an opening that is aligned with opening 74 for receiving pin 72.

Each of posts 19b-d has upper and lower mounting brackets for mounting side panels 14b-d to wall 12 in the same manner as described above with respect to side panel 14a. Accordingly, the pivotal mounting connections between side panels 14b-d and posts 19b-d are not described in detail herein.

Figure 6:
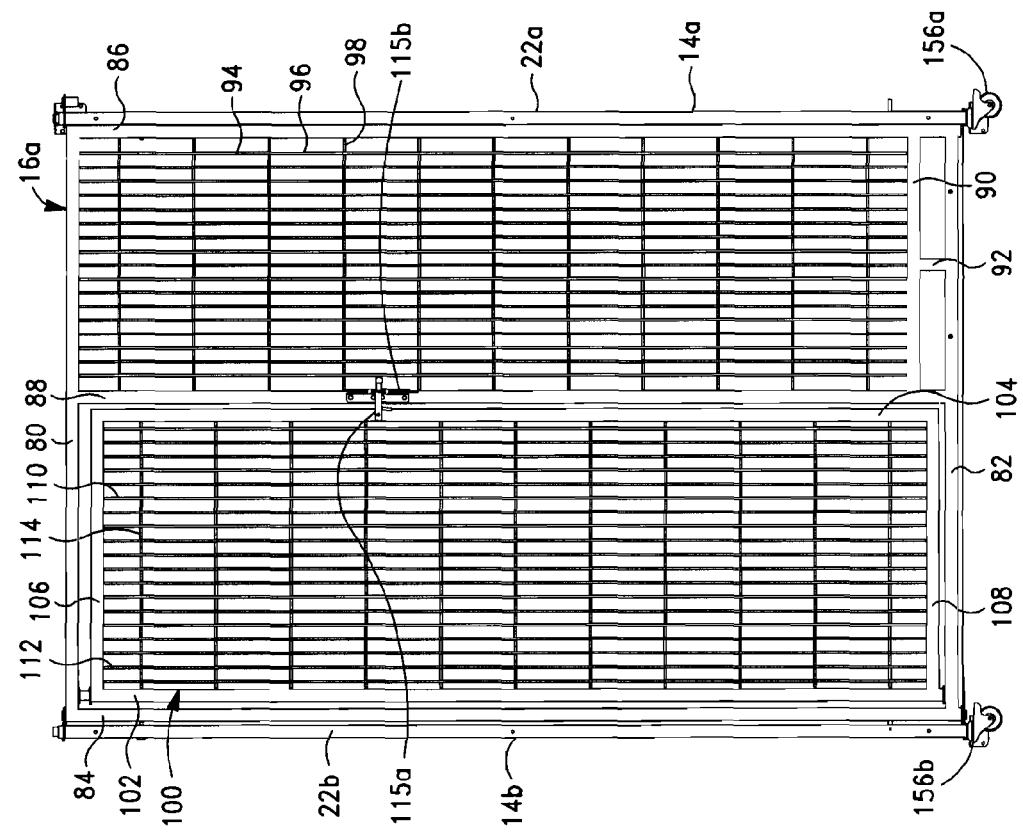
FIG. 6 is a front elevational view of one of the front panels.

Front panel 16a is described herein with reference to FIG. 6. Because each of the front panels 16a-c has a similar construction, only front panel 16a is described in detail herein. Front panel 16a has a rectangular outer frame consisting of horizontal upper and lower frame bars 80 and 82 that are joined with opposing vertical side frame bars 84 and 86, which form first and second side edges of the front panel 16a. A vertical intermediate frame bar 88 is joined with and extends between upper and lower frame bars 80 and 82. Intermediate frame bar 88 is spaced approximately equidistant from side frame bars 84 and 86. The frame of front panel 16a is further subdivided by a horizontal frame bar 90 that extends between vertical frame bars 86 and 88 at the lower right corner of the front panel 16a, and a vertical frame bar 92 that extends between the lower frame bar 82 and frame bar 90. Frame bar 92 is spaced approximately equidistant from vertical frame bars 86 and 88.

A wire grid 94 consisting of a plurality of interconnected vertical rods 96 and horizontal rods 98 encloses the area between upper frame bar 80, side frame bar 86, intermediate frame bar 88, and frame bar 90. Vertical rods 96 are joined with and extend between frame bars 80 and 90, and horizontal rods 98 are joined with and extend between frame bars 86 and 88.

A door 100 is pivotably mounted to upper and lower frame bars 80 and 82 for selectively allowing entrance into the space shown in FIG. 1 defined by side panels 14a and 14b, front panel 16a, wall 12, and floor panel 18a. Door 100 has a rectangular outer frame consisting of a pair of vertical frame bars 102 and 104 that are each joined with upper and lower frame bars 106 and 108. A wire grid 110 consisting of a plurality of interconnected vertical rods 112 and horizontal rods 114 encloses the area between the frame bars 102, 104, 106, and 108. Vertical rods 112 are joined with and extend between frame bars 106 and 108, and horizontal rods 114 are joined with and extend between frame bars 102 and 104. The frame bars and wire grids of front panel 16a are preferably constructed from metal, such as stainless steel or aluminum, or plastic. Door 100 also has a latch bar 115a mounted to frame bar 104 that is received by a latch keep 115b mounted on intermediate frame bar 88 when door 100 is in its closed position, as shown in FIG. 6.

Figure 12A:
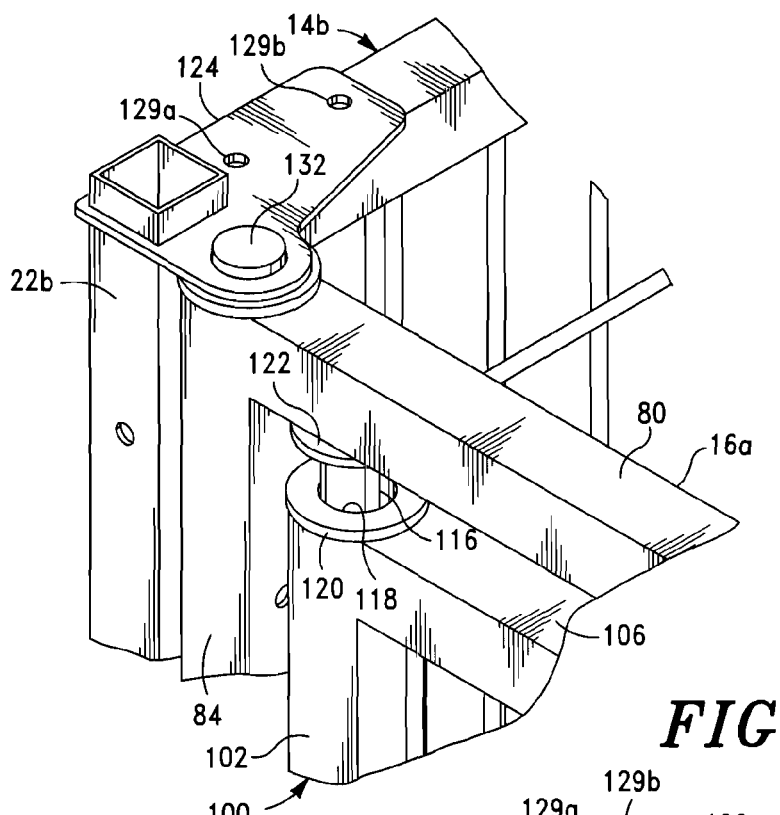
FIG. 12A is a detail view of a pivotal connection between front and side panels.

The pivotal connection between door 100 and upper frame bar 80 of front panel 16a is described herein with reference to FIG. 12A. A cylindrical pin 116 is received by an opening 118 in upper frame bar 106 of door 100 and an opening (not shown) in upper frame bar 80 of front panel 16a. Washers 120 and 122 are joined to frame bars 106 and 80, respectively, and have openings that receive pin 116 and are aligned with the openings in the frame bars 106 and 80. Referring now to FIG. 6, the lower frame bar 108 of door 100 is pivotally connected to the lower frame bar 82 of front panel 16a in the same manner as the pivotal connection between the upper frame bar 106 of door 100 and the upper frame bar 80 of front panel 16a that is described herein and shown in FIG. 12A.

Figure 12B:
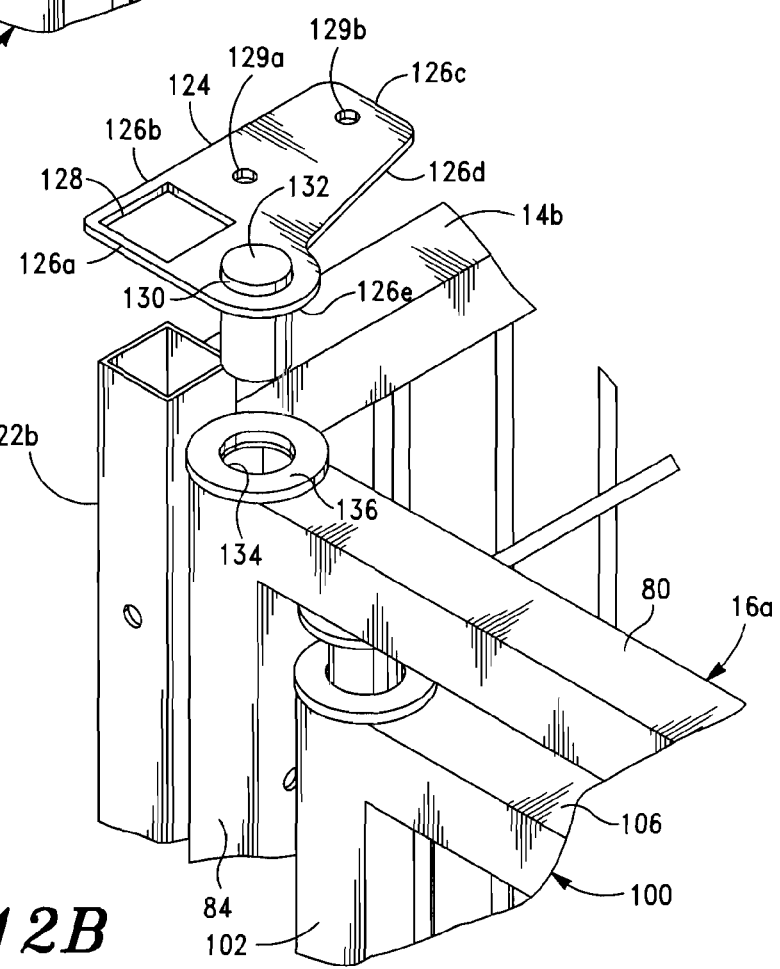
FIG. 12B is a partially exploded view of the pivotal connection between front and side panels.

Referring now to FIGS. 12A and 12B, the pivotal connection between upper sections of side panel 14b and front panel 16a is described herein. It should be understood that the connection between side panel 14c and front panel 16b and the connection between side panel 14d and front panel 16c is the same as that described herein with reference to side panel 14b and front panel 16a. Further, while side panel 14a is not shown as being pivotally connected to a front panel, it is within the scope of the invention for side panel 14a to be pivotally connected to a front panel in the same manner as described herein with respect to side panel 14b in order to add additional runs to the run bank 10.

Side panel 14b is pivotally connected to front panel 16a with an upper mounting bracket 124. Mounting bracket 124 is a flat plate with a shape that is defined by four linear side edges 126a-d (FIG. 12B) and an arcuate semi-circular edge 126e that joins edges 126a and 126d. Edges 126a and 126b and edges 126b and 126c are generally perpendicular to each other, while edges 126c and 126d are positioned at an obtuse angle with respect to each other. There is a rectangular hole 128 in bracket 124 adjacent to the corner where edges 126a and 126b meet. Hole 128 receives a top portion of the vertical frame bar 22b of side panel 14b. Preferably, bracket 124 is welded to frame bar 22b around the perimeter of hole 128. There are also two holes 129a and 129b in bracket 124 that are configured to receive fasteners (not shown) for joining bracket 124 to side panel 14b. There is a circular hole 130 in bracket 124 adjacent to arcuate edge 126e. Hole 130 receives a cylindrical pin 132 that is welded to bracket 124 around the perimeter of hole 130. There is an opening 134 in the upper frame bar 80 of front panel 16a that receives pin 132. A washer 136 is joined to frame bar 80 and has an opening that is aligned with opening 134 for receiving pin 132.

Figure 15A:
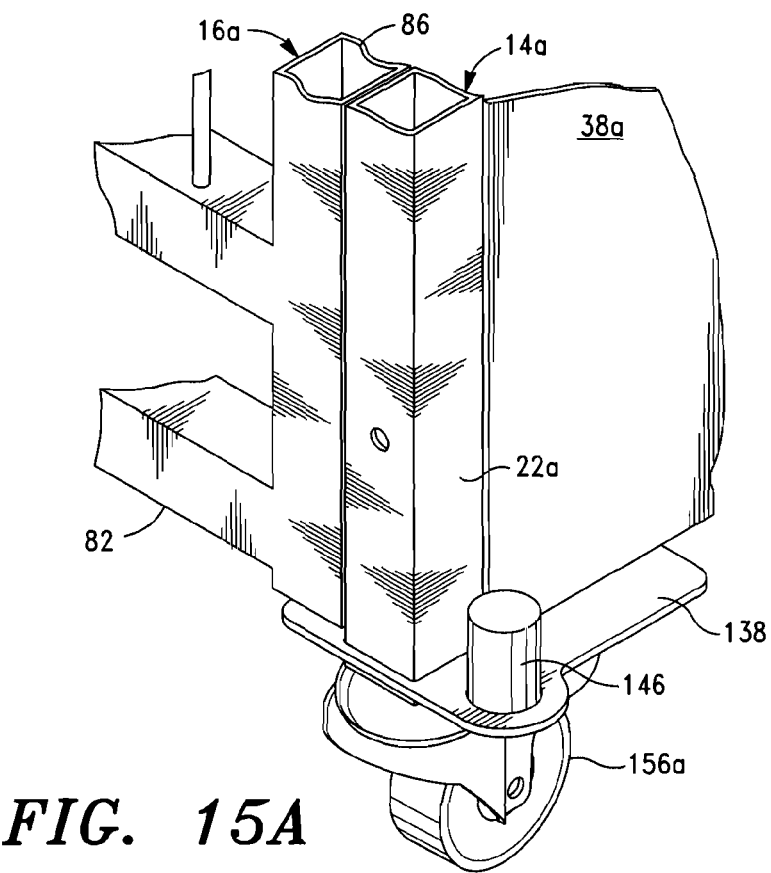
FIG. 15A is a detail view of a bottom side panel bracket and wheel.
Figure 15B:
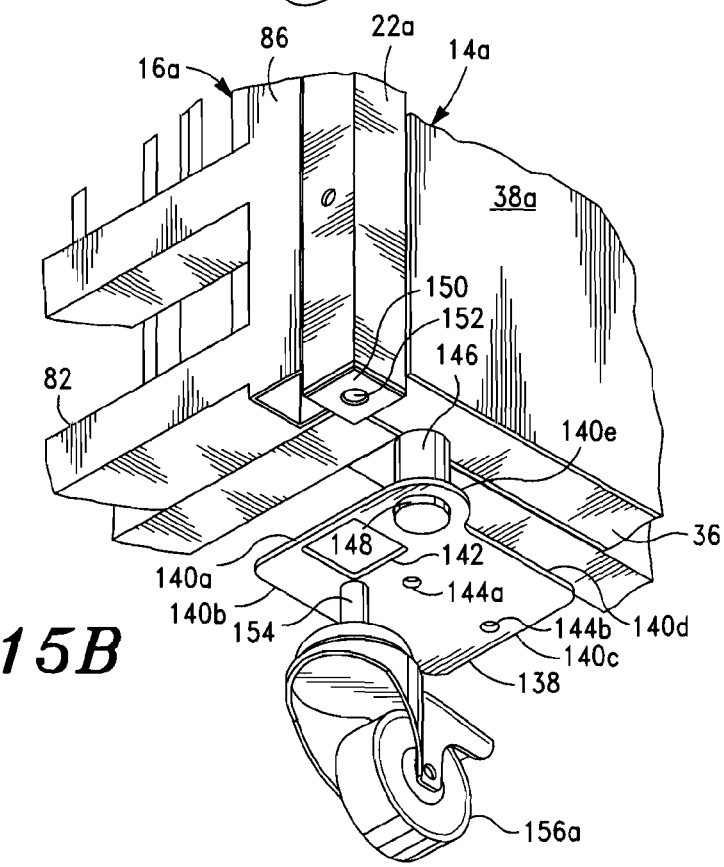
FIG. 15B is a partially exploded view of the bottom side panel bracket and wheel.

Referring now to FIGS. 15A and 15B, a bracket 138 that is joined to vertical frame bar 22a of side panel 14a is discussed in detail herein. Bracket 138 has four linear side edges 140a-d (FIG. 15B) and an arcuate edge 140e joining edges 140a and 140d. Edges 140a and 140b, edges 140b and 140c, and edges 140c and 140d are generally perpendicular to each other. Bracket 138 has a rectangular opening 142 that receives a lower portion of vertical frame bar 22a and is welded to the frame bar 22a around a perimeter of opening 142. Further, there are two holes 144a and 144b in bracket 138 for receiving fasteners to connect bracket 138 to the bottom frame bar 36 of side panel 14a. A cylindrical pin 146 is received by an opening 148 in bracket 138 adjacent to arcuate edge 140e. Pin 146 is preferably welded to bracket 138 around the perimeter of opening 148. Although side panel 14a is not pivotably connected to a front panel, if it was pivotably connected to a front panel as described above, pin 146 would be received by an opening in the bottom section of the front panel to make the pivotal connection. Because side panel 14a is not pivotably connected to a front panel, it can alternatively be described as an end panel of run bank 10.

There is a bracket identical to bracket 138 that is joined to the bottom of each vertical frame post 22b, 22c, and 22d (FIG. 1) of side panels 14b, 14c, and 14d in the same manner as described above with reference to bracket 138. Each of these brackets includes a pin like pin 146 on bracket 138 that is received by an opening in the bottom of one of front panels 14b, 14c, and 14d for pivotally connecting the bottom sections of the side and front panels.

Referring to FIG. 15B, a cap 150 that is connected to the bottom of vertical frame bar 22a has an opening 152 that receives a post 154 extending upward from the frame of a caster wheel 156a. Caster wheel 156a allows side panel 14a to pivot from the position shown in FIG. 1 to the position shown in FIG. 4, in which it is adjacent to wall 12. As shown in FIG. 1, there are additional caster wheels 156b-d that extend downward from side panels 14b-d, respectively, for allowing side panels 14b-d to pivot between the positions shown in FIGS. 1 and 4.

Figure 11:
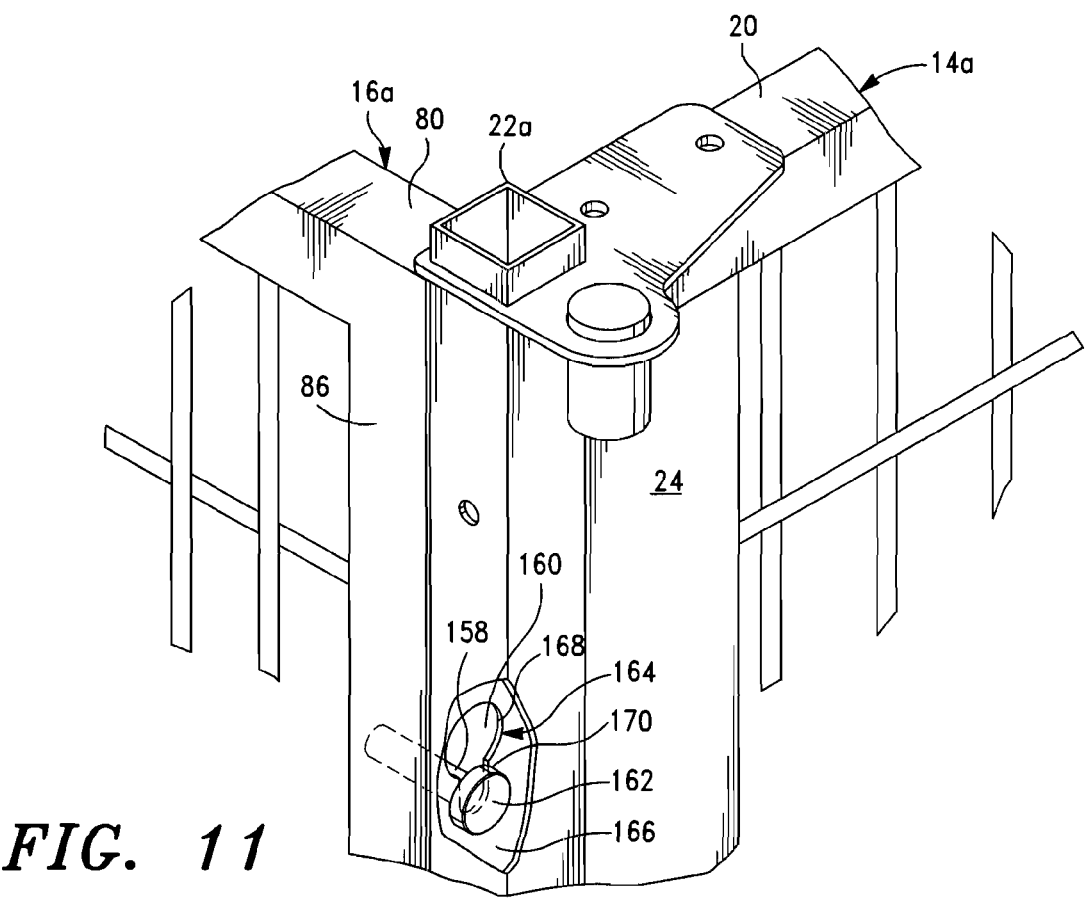
FIG. 11 is a detail view of a detachable connection between the front and side panels.
Figure 11A:
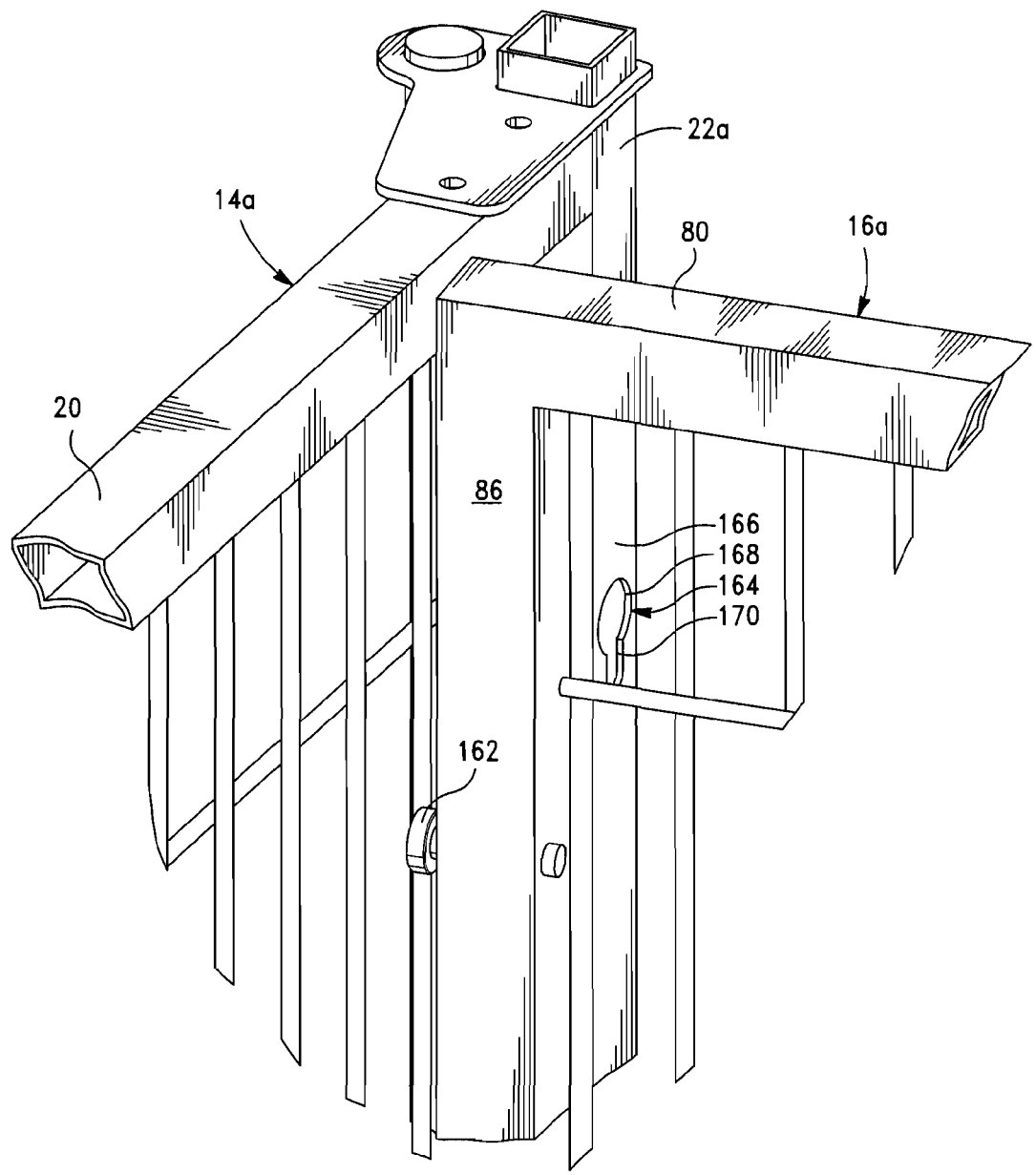
FIG. 11A is a detail view showing the front and side panels detached.

The detachable connection between front panel 16a and side panel 14a is shown in detail in FIGS. 11 and 11A. A cylindrical pin 158 (FIG. 11) extends outward from a side edge 160 of vertical frame bar 86 of front panel 16a. A round disc 162 with a diameter that is greater than pin 158 extends outward from the end of the pin 158. There is a slot 164 in a side edge 166 of the vertical frame bar 22a for receiving pin 158 and disc 162. Slot 164 has a shape defined by a circular opening 168 and a narrower, elongate opening 170 extending downward from opening 168. Circular opening 168 has a diameter that is slightly greater than the diameter of disc 162 for receiving the disc 162. Likewise, elongate opening 170 has a width that is slightly greater than the diameter of pin 158 for receiving the pin 158. Opening 170 has a width that is smaller than the diameter of disc 162 for retaining disc 162 within slot 164 as shown in FIG. 11. To detachably join front panel 16a and side panel 14a, the vertical frame bar 86 of front panel 16a is raised slightly upward until disc 162 aligns with circular opening 168 in vertical frame bar 22a of side panel 14a. The disc 162 is inserted through circular opening 168 and the upward force on front panel 16a is released so that pin 158 slides down into elongate opening 170. In this position, front panel 16a is restrained from pivoting with respect to side panel 14a until front panel 16a is raised to release disc 162 from slot 164.

There is another pin and slot on front panel 16a and side panel 14a, respectively, that are vertically spaced downward from pin 158 and slot 164 for detachably joining front panel 16a and side panel 14a. There are also a pair of pins on front panel 16b for reception by a pair of slots on side panel 14b and a pair of pins on front panel 16c for reception by a pair of slots on side panel 14c.

Figure 8:
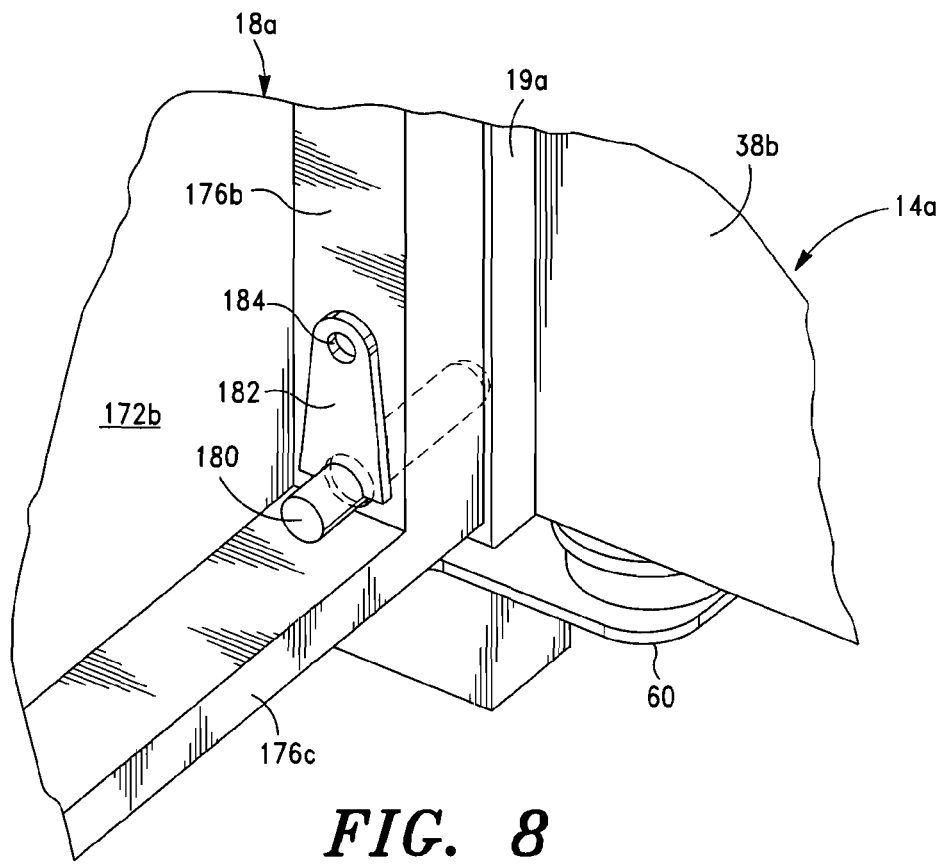
FIG. 8 is a detail view of a connection between a floor panel and a mounting post.

Referring to FIG. 2, floor panel 18a is formed form a planar sheet 172 that is supported by a frame 174. Sheet 172 has a top side 172a, shown in FIG. 1, and a bottom side 172b, shown in FIG. 2. Frame 174 comprises a rectangular base formed from four bars 176a-d, and a plurality of cross-members, one of which is identified as 178, extending between bars 176b and 176d. Referring now to FIG. 8, floor panel 18a is pivotably connected to mounting post 19a via a cylindrical hinge pin 180 that is received by aligned openings in frame bar 176b of floor panel frame 174 and mounting post 19a. Hinge pin 180 is joined to a tab 182 that is joined to frame bar 176b with a fastener (not shown) received by an opening 184 in tab 182. There is a similar hinge pin (not shown) that pivotably connects the frame bar 176d of floor panel frame 174 (FIG. 2) to mounting post 19b. Sheet 172 and frame 174 may be constructed from any suitable material including metal, plastic, or in the case of sheet 172, glass. Floor panels 18b and 18c are pivotably mounted to posts 19*b-d* in a similar manner as that described herein with respect to floor panel 18*a*.

Figure 10:
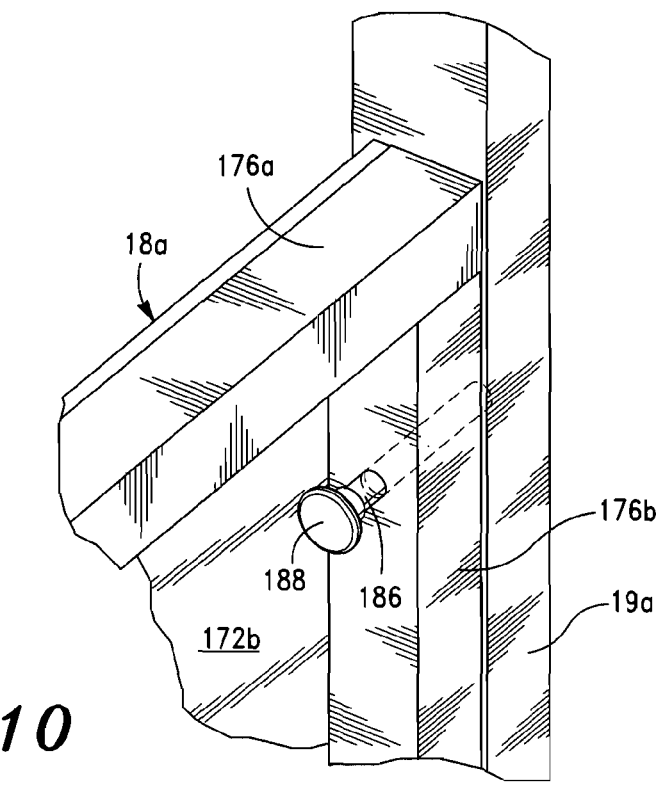
FIG. 10 is a detail view of a removable pin securing the floor panel to the mounting post.

Referring now to FIG. 10, there is a cylindrical locking pin 186 that secures floor panel 18*a* to mounting post 19*a* when the floor panel 18*a* is in the stored position shown in FIGS. 2 and 10. Locking pin 186 is received by aligned openings in frame bar 176*b* of floor panel frame 174 and mounting post 19*a* to secure floor panel 18*a* to post 19*a*. A knob 188 is joined to an end of pin 186 so that an operator can easily grasp the knob 188 for removing or inserting the pin 186. There is a similar locking pin (not shown) that secures the frame bar 176*d* (FIG. 2) of floor panel frame 174 to mounting post 19*b*. There are also a pair of locking pins that operate to secure floor panels 18*b* and 18*c* to posts 19*b-d* in a similar manner as described herein with respect to floor panel 18*a*.

Figure 9:
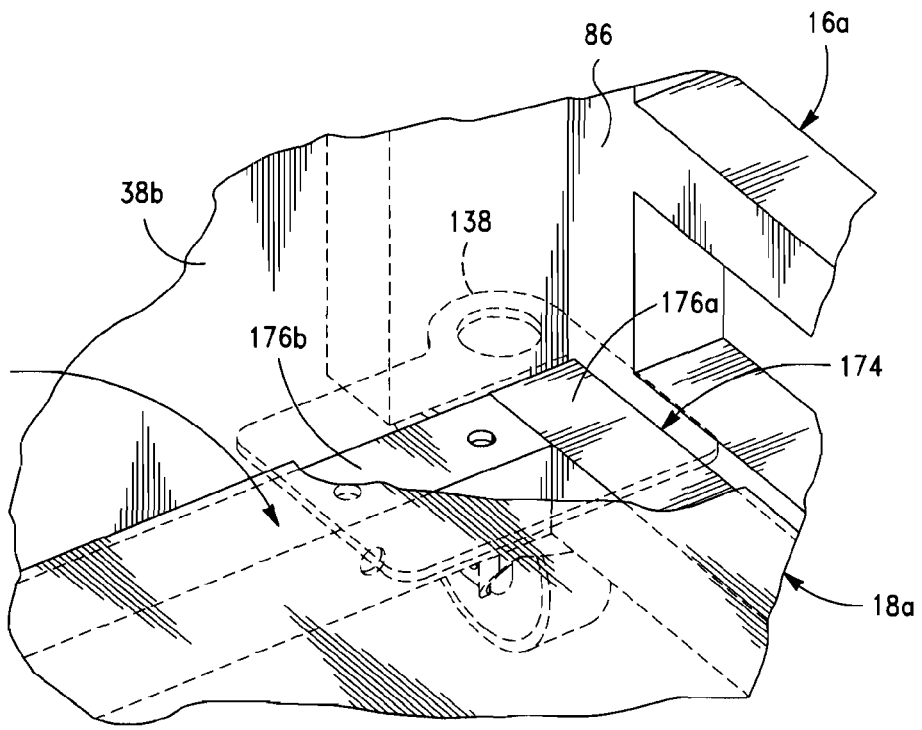
FIG. 9 is a detail view of the floor panel supported by a bracket on the bottom of a side panel.

Floor panel 18*a* is moveable between the stored position shown in FIG. 2 and the operational position shown in FIG. 1 in which it extends outward from wall 12 to front panel 16*a*. Referring now to FIG. 9, when floor panel 18*a* is in its operational position, the corner of floor panel frame 174 where frame bars 176*a* and 176*b* meet is supported by bracket 138. Bracket 138 supports floor panel 18*a* in a position where floor panel 18*a* is substantially horizontal and perpendicular to wall 12, side panels 14*a* and 14*b*, and front panel 16*a*. The corner of floor panel 18*a* where frame bars 176*a* and 176*d* meet is supported by a bracket similar to bracket 138 that is mounted to the bottom of post 22*b* (FIG. 1). The corners of floor panels 18*b* and 18*c* are supported in a similar manner by brackets mounted on posts 14*b*-14*d*.

Although not shown in the drawings, it is within the scope of the invention for the run bank 10 to have a rear panel that extends between side panels 14*a* and 14*b*. Preferably, a rear panel is included with run bank 10 when it is desirable to protect wall 12 from damage. The optional rear panel is adjacent to wall 12 and perpendicular to side panels 14*a* and 14*b*. The rear panel could be mounted to posts 19*a* and *b*, or the rear panel could be mounted directly to wall 12. The rear panel could be permanently joined with posts 19*a* and *b* or it could be detachably joined to the posts for easy installation and removal. The rear panel could be similar in construction to side panel 14*a* with a frame that mounts a planar sheet and a wire grid, or the rear panel could comprise a frame that mounts either a planar sheet or a wire grid. It is also within the scope of the invention for the run bank 10 to have similar optional rear panels that extend between side panels 14*b* and 14*c* and side panels 14*c* and 14*d* adjacent to wall 12.

It is also within the scope of the invention for the run bank to have a top panel (not shown) that extends outward from wall 12 and encloses the top of the volume defined by wall 12, side panels 14*a* and 14*b*, front panel 16*a*, and floor panel 18*a*. Preferably, the optional top panel is parallel to floor panel 18*a* and has an underside that is supported by one or more of side panels 14*a* and 14*b*, front panel 16*a*, or a support extending from wall 12. The optional top panel could be pivotably mounted to wall 12 via mounts that are attached to wall 12, or the top panel could be pivotably mounted to one of side panels 14*a* and 14*b* and front panel 16*a*. If mounted to wall 12, the top panel is preferably pivotable between a stored position, in which it is adjacent and parallel to wall 12, and an extended position, in which it extends outward from wall 12 and is supported by the upper edge of front panel 16*a*. If mounted to one of side panels 14*a* and 14*b*, the top panel is preferably pivotable between a stored position, in which it is adjacent and parallel to the side panel 14*a* or 14*b* to which it is mounted, and an extended position, in which it extends outward from the side panel 14*a* or 14*b* to which it is mounted and is supported by the upper edge of the other side panel 14*a* or 14*b*. If mounted to front panel 16*a*, the top panel is preferably pivotable between a stored position, in which it is adjacent and parallel to front panel 16*a*, and an extended position, in which it extends outward from front panel 16*a* and is supported by the top edge of either of side panels 14*a* and 14*b* or a support structure extending outward from wall 12. The top panel could also be placed on top of side panels 14*a* and 14*b* and front panel 16*a* after those panels are connected in the manner shown in FIG. 1. In this configuration, the top panel could be removed from the tops of the panels 14*a*, 14*b*, and 16*a* before the panels are pivoted into the position shown in FIG. 3 for storage. The run bank 10 could also include similar top panels over runs 13*b* and 13*c*.

In operation, the mounting posts 19*a-d* of run bank 10 are mounted to wall 12 with brackets 40 and 60 and the side panels 14*a-d*, front panels 16*a-c*, and floor panels 18*a-c* are assembled in the manner shown in FIG. 1. Door 100 can be opened and closed to place animals within run 13*a*. Likewise, the doors on runs 13*b* and 13*c* can also be opened and closed to place animals within the run bank 10.

Run bank 10 can be folded against wall 12 if the operator of the run bank 10 does not need it to house animals in order to decrease the space that the run bank 10 occupies. To fold the run bank 10 against wall 12, first, floor panels 18*a*, 18*b*, and 18*c* are pivoted from the position shown in FIG. 1 to the position shown in FIG. 2, in which they are adjacent wall 12. Pin 186 (FIG. 10) is then inserted through the aligned openings of the floor panel 18*a* and mounting post 19*a*, and another pin like pin 186 is inserted through aligned openings in floor panel 18*a* and mounting post 19*b* to secure floor panel 18*a* to posts 19*a* and *b*. Likewise, pins like pin 186 are inserted through aligned openings in floor panels 18*b* and 18*c* and mounting posts 19*b*, 19*c*, and 19*d* to secure floor panels 18*b* and 18*c* to mounting posts 19*b-d*.

Next, front panel 16*a* is detached from side panel 14*a* by raising the side of front panel 16*a* adjacent side panel 14*a* upward so that disc 162, shown in FIGS. 11 and 11A, can be removed from slot 164 through opening 168. Front panels 16*b* and 16*c* are raised upward in a similar manner to detach them from side panels 14*b* and 14*c*, respectively. Then, front panels 16*a-c* are rotated with respect to side panels 14*b-d*, respectively, until the front panels 16*a-c* are adjacent to the respective side panel 14*b-d* as shown in FIG. 3. Side panels 14*a-d* are then pivoted with respect to posts 19*a-d* from the position shown in FIG. 3 to the position shown in FIG. 4, in which they are adjacent to wall 12. In order to move the run bank 10 back to its operational position, the steps above are followed in reverse.

As shown in FIG. 5, it is also within the scope of the present invention for some of the side and front panels 14*a-d* and 16*a-c* to be stored adjacent to wall 12 and some of the panels to remain in an operational position. FIG. 5 shows side panels 14*a* and 14*b* extending outward from wall 12 and front panel 16*a* connected to panel 14*a* so that animals may be housed in the space enclosed by wall 12, side panels 14*a* and 14*b* and front panel 16*a*. Floor panel 18*b* is rotated adjacent to wall 12 where it is secured to posts 19*b* and 19*c*. Further, side panels 14*c* and 14*d* along with front panels 16*b* and 16*c* are rotated adjacent to wall 12 in their stored position. It should be appreciated that it is within the scope of the present invention for only side panel 14*d* and front panel 16*c* to be positioned adjacent to wall 12 while side panel 14*c* extends outward from wall 12 and front panel 16*b* is connected to side panel 14*b*. Further, it is within the scope of the invention for any of the runs 13*a-c* to be operational while the remaining runs 13*a-c* are in their stored position.

From the foregoing it will be seen that this invention is one well adapted to attain all ends and objectives herein-above set forth, together with the other advantages which are obvious and which are inherent to the invention.

Since many possible embodiments may be made of the invention without departing from the scope thereof, it is to be understood that all matters herein set forth or shown in the accompanying drawings are to be interpreted as illustrative, and not in a limiting sense.

While specific embodiments have been shown and discussed, various modifications may of course be made, and the invention is not limited to the specific forms or arrangement of parts and steps described herein, except insofar as such limitations are included in the following claims. Further, it will be understood that certain features and subcombinations are of utility and may be employed without reference to other features and subcombinations. This is contemplated by and is within the scope of the claims.

What is claimed and desired to be secured by Letters Patent is as follows:

1. An animal run, comprising:
    first and second side panels pivotally mounted to a support structure wherein the support structure extends vertically and is fixed within a first plane, each of said side panels moveable between a stored position in which it is positioned substantially parallel said first plane and an operational position in which it extends outward at an angle from said first plane;
    a front panel pivotally mounted to one of said side panels and operable to be detachably coupled with the other one of said side panels, said front panel moveable between a stored position in which it is substantially parallel said first plane and an operational position in which it is detachably coupled with said other one of said side panels; and
    a floor positioned between said first and second side panels when said first and second side panels are in said operational position, said floor having an upper surface and being pivotally coupled with at least one of the panels or support structure so as to be movable between a stored position in which said upper surface is aligned substantially parallel said first plane, and an operational position in which a front edge of said floor is positioned adjacent a bottom edge of said front panel, a first side edge of said floor is positioned adjacent a bottom edge of said first side panel, and a second side edge of said floor is positioned adjacent a bottom edge of said second side panel, wherein said side panels, said front panel, said floor, and said support structure together define and enclose an interior space for housing animals when each of said side panels, said front panel, and said floor is in its operational position.

2. The animal run of claim 1, wherein said support structure comprises a vertically extending wall and said side panels are mounted a distance apart one another along the length of said wall.

3. The animal run of claim 2, wherein said vertically extending wall serves to enclose said interior space when each of said side panels and said front panel is in its operational position.

4. The animal run of claim 1, wherein said support structure comprises first and second vertically extending posts wherein the posts are aligned in said first plane and wherein the first and second side panels are mounted to the first and second posts respectively.

5. The animal run of claim 1, wherein said support structure comprises a rear panel, wherein said rear panel serves to enclose said interior space when each of said side panels and said front panel is in its operational position.

6. The animal run of claim 1, wherein said side panels are directly pivotally mounted to said support structure.

7. The animal run of claim 1 wherein said first and second side panels are indirectly pivotally mounted to said support structure via first and second mounts respectively.

8. The animal run of claim 7, wherein said mounts are fixedly attached to said support structure.

9. The animal run of claim 8, wherein said mounts brackets are integrally formed with said side panels.

10. The animal run of claim 1, wherein said front panel comprises a frame that is pivotally coupled with one of said side panels and operable to be detachably coupled with the other one of said side panels, said frame mounting a door moveable between a closed position in which it is positioned within said frame and an open position to provide access to said interior space when said side panels and said front panel are in the operational position.

11. The animal run of claim 1, wherein said floor is pivotally coupled with said support structure.

12. The animal run of claim 1, further comprising first and second wheels each mounted to a bottom of one of said first and second side panels.

13. The animal run of claim 1, wherein said front panel comprises a pin that is operable to be received by a slot in the other one of said side panels for detachably coupling said front panel and said other one of said side panels.

14. The animal run of claim 1, wherein said first and second side panels are positioned substantially parallel one another when in the operational position and said front panel is positioned substantially parallel said support structure when in the operational position.

15. The animal run of claim 14, wherein said first and second side panels are positioned at a substantially right angle from said first plane when in the operational position.

16. The animal run of claim 1, wherein said first and second side panels and said front panel define a first interior space when each of said panels is in its operational position, and further comprising:
    a third side panel pivotally mounted to said support structure, said third side panel moveable between a stored position in which it is substantially parallel said first plane and an operational position in which it extends outward at an angle from said first plane; and
    a second front panel pivotally coupled with one of said side panels and operable to be detachably coupled with an adjacent one of said side panels, said second front panel moveable between a stored position in which it is substantially parallel said first plane and an operational position in which it is detachably coupled with said adjacent one of said side panels, wherein said second front panel defines a second interior space combined with the side panels to which it is coupled when each panel is in its operational position.

17. The animal run of claim 16, wherein said second front panel comprises a frame that is pivotally coupled with the side panel to which the front panel is pivotally coupled and operable to be detachably coupled with the adjacent one of said side panels, said frame mounting a door moveable between a closed position in which it is positioned within said frame and an open position to provide access to said second interior space.

18. The animal run of claim 16, further comprising a second floor positioned between said second and third side panels when said second and third side panels are in said operational position, said second floor having an upper surface and being moveable between a stored position in which said upper surface is aligned substantially parallel said first plane, and an operational position in which a front edge of said second floor is positioned adjacent a bottom edge of said second front panel.

19. The animal run of claim 18, further comprising wheels mounted to a bottom of said first, second and third side panels.

20. An animal run, comprising:
a plurality of side panels mounted in series along the length of a support structure, wherein said support structure is vertically fixed within a first plane and wherein said each side panel is moveable between a stored position in which said side panel is positioned substantially parallel said support structure and an operational position in which said side panel extends outward at an angle substantially perpendicular from said support structure;
a plurality of front panels, wherein each said front panel is pivotally coupled with one of said side panels and operable to be detachably coupled with an adjacent one of said side panels, each said front panel being moveable between a stored position in which it is substantially parallel said side panels and an operational position in which it is detachably coupled with said adjacent one of said side panels; and
a plurality of floors positioned between adjacent side panels when said adjacent side panels are in said operational position, wherein each of said floors is pivotally coupled with at least one of the panels or support structure so as to be movable between a stored position in which an upper surface of the floor is positioned substantially parallel said support structure, and an operational position in which a front edge of said floor is adjacent a bottom edge of a corresponding front panel, and side edges of said floor are each adjacent a bottom edge of a corresponding side panel, wherein each of said front panel, the adjacent side panels to which it is coupled, the corresponding floor, and the support structure together define and enclose an interior space for housing animals when each of said front panel, the adjacent side panels to which it is coupled, and the corresponding floor is in its operational position.

21. The animal run of claim 20, wherein each said front panel comprises a pivoting door moveable between a closed position and an open position to provide access to said enclosed space.

22. An animal run of claim 20, wherein each said front panel has an inner surface that is positioned in abutting engagement facing a surface of the side panel to which is it pivotally coupled when in the stored position.

23. The animal run of claim 20, wherein each of said plurality of floors is mounted to said support structure between adjacent side panels.

24. An animal run comprising:
first and second side panels that each pivot relative to a fixed pivot point adjacent a support surface between a stored position and an operational position, wherein each said pivot point is aligned along a first plane and said support surface is vertically fixed along the first plane, wherein said side panels are positioned substantially parallel the first plane in the stored position and are positioned at an angle from the first plane in the operational position;
a front panel pivotally coupled with one of said side panels and configured to be detachably coupled to the other said side panel when in the operational position, wherein the front panel is positioned parallel the side panel to which it is pivotally coupled and is detached from the other side panel in the stored position, and wherein the front panel is positioned at an angle from the side panel to which it is pivotally coupled and is detachably coupled with the other side panel in the operational position; and
a bottom panel that is positioned between said first and second side panels when said first and second side panels are in said operational position, said bottom panel having an upper surface and being pivotally coupled with at least one of the panels or support surface so as to be movable between a stored position in which said upper surface is aligned substantially parallel said first plane, and an operational position in which a front edge of said bottom panel is positioned adjacent a bottom edge of said front panel, a first side edge of said bottom panel is positioned adjacent a bottom edge of said first side panel, and a second side edge of said bottom panel is positioned adjacent a bottom edge of said second side panel, wherein said side panels, said front panel, said bottom panel, and said support surface together define and enclose an interior space for housing animals when each of said side panels, said front panel, and said bottom panel is in its operational position.

25. The animal run of claim 24, wherein said front panel comprises a frame that is pivotally coupled with one of said side panels and operable to be detachably coupled with the other one of said side panels, said frame mounting a door moveable between a closed position in which it is positioned within said frame and an open position to provide access to said interior space when said side panels and said front panel are in the operational position.

26. The animal run of claim 24, wherein said bottom panel pivots relative to one or more fixed pivot points aligned along said first plane.

27. The animal run of claim 24, further comprising first and second wheels each mounted to a bottom of one of said first and second side panels.

28. The animal run of claim 24, wherein said front panel comprises a pin that is operable to be received by a slot in the other one of said side panels for detachably coupling said front panel and said other one of said side panels.

29. The animal run of claim 24, wherein said first and second side panels are positioned substantially parallel one another when in the operational position and said front panel is positioned substantially perpendicular said side panels when in the operational position.

30. The animal run of claim 29, wherein said first and second side panels are positioned at a substantially right angle from said first plane when in the operational position.

31. The animal run of claim 24, wherein said first and second side panels are mounted to a floor at said fixed pivot points.

32. The animal run of claim 31, wherein said first and second side panels are mounted adjacent a vertically extending wall, wherein said wall encloses said interior space.

* * * * *

UNITED STATES PATENT AND TRADEMARK OFFICE
CERTIFICATE OF CORRECTION

| | |
|---|---|
| PATENT NO. | : 8,438,995 B1 |
| APPLICATION NO. | : 12/910307 |
| DATED | : May 14, 2013 |
| INVENTOR(S) | : Karl J. Donahue et al. |

It is certified that error appears in the above-identified patent and that said Letters Patent is hereby corrected as shown below:

In the Claims,
Column 12
Line 10, delete "brackets" between "mounts" and "are".

Signed and Sealed this
Twelfth Day of August, 2014

Michelle K. Lee
*Deputy Director of the United States Patent and Trademark Office*